United States Patent [19]

Peled et al.

[11] Patent Number: 5,447,807
[45] Date of Patent: Sep. 5, 1995

[54] POWER SOURCE

[76] Inventors: Emanuel Peled, 25 Hanotea Street, Even Yehuda 40500; Ronen Cohen, Ein Ganim 55, Petach Tikva 49444; Avraham Melman, Kudoshi Kahir 30, Holon 58362; Yizchak Lavi, P.O. Box 196, Beit Yizchak 42920, all of Israel

[21] Appl. No.: 712,497

[22] Filed: Jun. 10, 1991

[30] Foreign Application Priority Data

Jun. 13, 1990 [IL] Israel .................................. 94726

[51] Int. Cl.$^6$ ............................................ H01M 6/50
[52] U.S. Cl. ........................................ 429/62; 429/120
[58] Field of Search ........................... 429/62, 120, 148

[56] References Cited

U.S. PATENT DOCUMENTS

| | | | |
|---|---|---|---|
| 4,007,315 | 2/1977 | Brinkman et al. | 429/62 |
| 4,107,402 | 8/1978 | Dougherty et al. | 429/148 X |
| 4,226,282 | 10/1980 | Kunsagi | 165/903 X |
| 4,727,006 | 2/1988 | Malinowski et al. | 429/62 X |
| 4,883,726 | 11/1989 | Peled et al. | 429/120 |

FOREIGN PATENT DOCUMENTS 5-62718  3/1993  Japan ........................... H01M 10/50

*Primary Examiner*—Stephen Kalafut
*Attorney, Agent, or Firm*—McAulay Fisher Nissen Goldberg & Kiel

[57] ABSTRACT

A system for the supply of electrical energy by means of one or more high-power electrochemical cells. The system comprises a housing, such cell or cells being located at least partially in said housing and a fan or fans actuated during heavy discharge of the cell or cells to prevent the temperature rise of the cell or cells above a certain value. The system is of importance for high power cells, such as the various types of lithium cells, calcium, lithium alloy and calcium alloy cells. Temperature sensing means and a switch can be provided adapted to actuate the fan or fans when the temperature exceeds a certain value so as to provide cooling forced air circulation.

14 Claims, 3 Drawing Sheets

POWER SOURCE

BACKGROUND OF THE INVENTION

1. Field of the Invention

According to the present invention there are provided "super-power" electrochemical cells and batteries comprising a plurality of such cells, which are characterized by the provision of means for preventing excessive temperature rise during discharge of such cells.

The invention is of special importance in the field of cells wherein an anode made of an alkali metal (preferably lithium) or an alkaline earth (preferably calcium or alloys of same) is used.

2. Description of the Related Art

When a typical Ca/TC "C" size cell, that is known in the art, is discharged under a 1.2 ohm load (100 W/kg), the cell merely provides approximately 1 Ah. The heavy discharge rate causes the cell to reach temperatures near 120 degrees Celsius. At this temperature, the Tefzel separator within the cell melts, causing the cell voltage to decline to zero.

SUMMARY OF THE INVENTION

There exists a growing need for a "super power" battery which can deliver continuously 100 W/kg (about 2 A for a C-size lithium cell).

Discharges of high power lithium batteries above 25.50 W/kg (about 0.5-1 A for a C-size cell) or at elevated temperatures are recommended to be intermittent, controlled or monitored to prevent overheating and possible venting or explosion.

The increasing interest in safe, high-power high-energy density batteries has encouraged research on the Calcium/TC battery system. Calcium/TC cells have been shown to have better safety features than have high power lithium cells. They successfully passed charge, forced discharge, short circuit, and nail penetrations abuse tests. The enhanced safety of the Calcium/TC cells results from the high melting point of the calcium anode and from the difficulty in plating metallic calcium (strontium or barium) from TC-$MX_2$ solutions (M=Ca, Ba, Sr; X=$AlCl_4$). The major drawback of the Calcium/TC cell is the rapid corrosion of the calcium anode (i.e. too short shelf-life). This problem has been successfully solved by replacement of the $CaX_2$ electrolyte by $SrX_2$ or $BaX_2$ electrolytes. Such substitutions change the morphology, chemical composition and properties of the SEI which covers the calcium anode. The addition of $SO_2$ to the electrolyte was found to be beneficial with respect to both storage capability and performance. With small laboratory glass cells, it was found that the voltage and the discharge capacity of carbon cathodes could be dramatically improved by fabricating porous cathodes from a blend of high- and low-surface area carbon blacks. However, this finding could not be realized with real hardware D-size cells.

The C-size calcium/$SrX_2$-TC cell has been recently optimized for room temperature (RT) applications in our laboratory. It delivers 5.5 /Ah at low rates and 4.4/Ah at about 0.9 A, i.e. it has 50-80% more capacity (at RT) than has a similar size SAFT Li/$SO_2$ (LO285H) cell. Such cells have been stored for up to five weeks at 70° C. plus an additional 10 months at RT with less than 5% loss in capacity. Their heat generation rate, as measured under OCV conditions, is smaller than that of equivalent size wound Li-TC cells, thus they have a lower self discharge rate.

We recently found that the heat generation rate during discharge of Ca/TC cells is larger than that of wound Lithium cells, and, under certain conditions is the factor which limits the deliverable power of the cell. There are two major contributions to it—a polarization heat ($W_p$) and Chemical heat ($W_c$) which results from a fast corrosion of the anode (low Faradaic efficiency) especially at high current densities and high temperatures. However, due to better safety features of the calcium/TC cell it was estimated that it may be possible to safely discharge it at about 100 W/kg if the excessive heat could be rejected to the surrounding.

EXAMPLES

Example 1: (Not Part of this Invention)

A Ca/TC "C" size cell that was discharged under 1.2/Ω loads (100 w/kg) gave only 1 Ah. The heavy discharge rate caused the cell to reach 120° C. At this temperature the Tefzel separator melted and the cell voltage declined to zero.

It is one of the objects of the present invention to provide electrochemical cells, especially but not exclusively of the lithium, calcium, calcium alloy type which can be discharged at an increased discharge rate, without undue heating of the cell during such heavy discharge. The temperature of the cells during heavy discharge is maintained by air cooling.

Thus, there are provided electrochemical cells of the type set out above which are provided with means for forced convection air cooling. Such cooling can be conveniently attained by the provision of a small fan, actuated by the cell during its discharge, or by a separate power source. According to the present invention there are also provided batteries comprising a plurality of interconnected electrochemical cells positioned in a common housing, there being provided one or more fans for establishing a forced air convection preventing overheating of the cells during heavy discharge.

The following examples illustrate the invention and compare it with cells of the same type without such cooling means.

According to the present invention, the fan chamber can be physically located in the instrument housing which is powered by such battery, while there is an appropriate opening for air inlet between the battery and the fan chamber.

The aim of the present invention is to find a way of increasing the rate of capability of calcium, lithium or any other cell with the use of self air-forced convection cooling of the battery during discharge.

Schematic description of multi-cell air cooled battery is in FIG. 3.

DETAILED DESCRIPTION OF THE PREFERRED EMBODIMENTS

Figure 1:
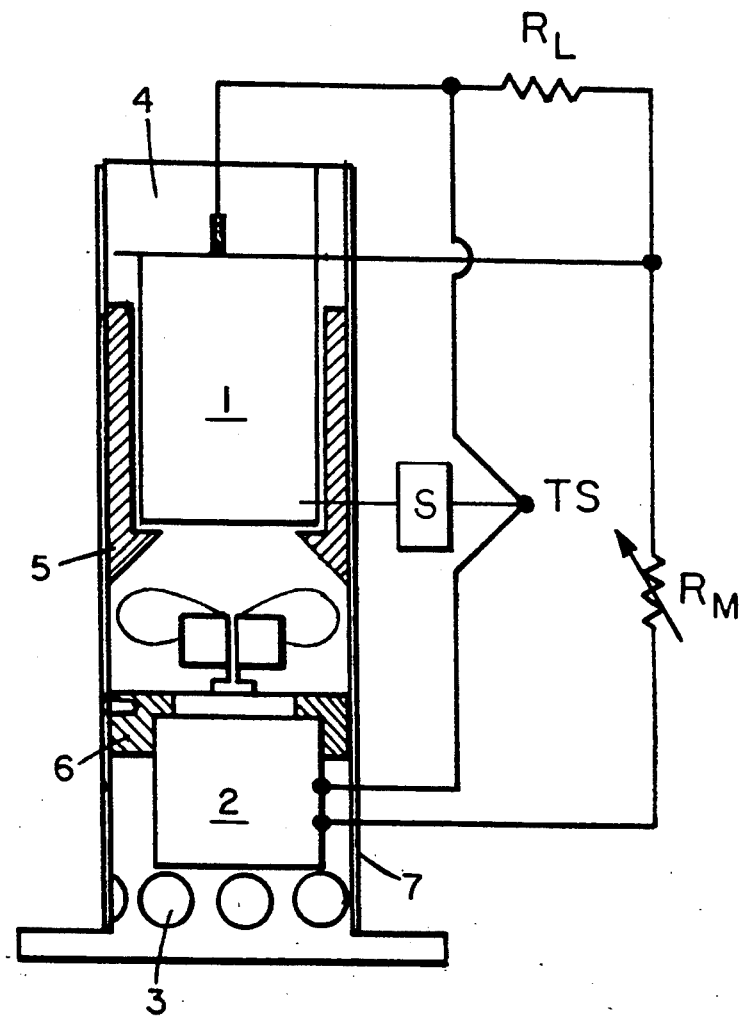
FIG. 1 is a schematic side-view, in partial section of a cell according to the invention and a control circuit therefor.

As a test vehicle "C"-size calcium/TC cells were used. Those cells had 200–220 cm$^2$ electrode area and a 50$\mu$ thick Tefzel separator of 80% porosity. The electrolyte was 0.84M $SrX_2$ in TC with 20%(V/V) $SO_2$. The SS- can and cover were Hudson commercial components. The cells were discharged inside a set-up described in FIG. 1. This set-up contained a plastic tube, 7, having a 30 mm inside diameter, on which the calcium cell, 1, was mounted using battery holder, 5. A toy electric motor, 2, with a fan was mounted below the cell using another holder, 6. The electric motor was powered either by an external power supply or by the cell itself through voltage regulator $R_M$ (FIG. 1). FIG. 1 also illustrates a cell loading resistor, $R_L$, air inlet holes, 3, an air outlet, 4, and a thermal switch, TS.

Figure 2:
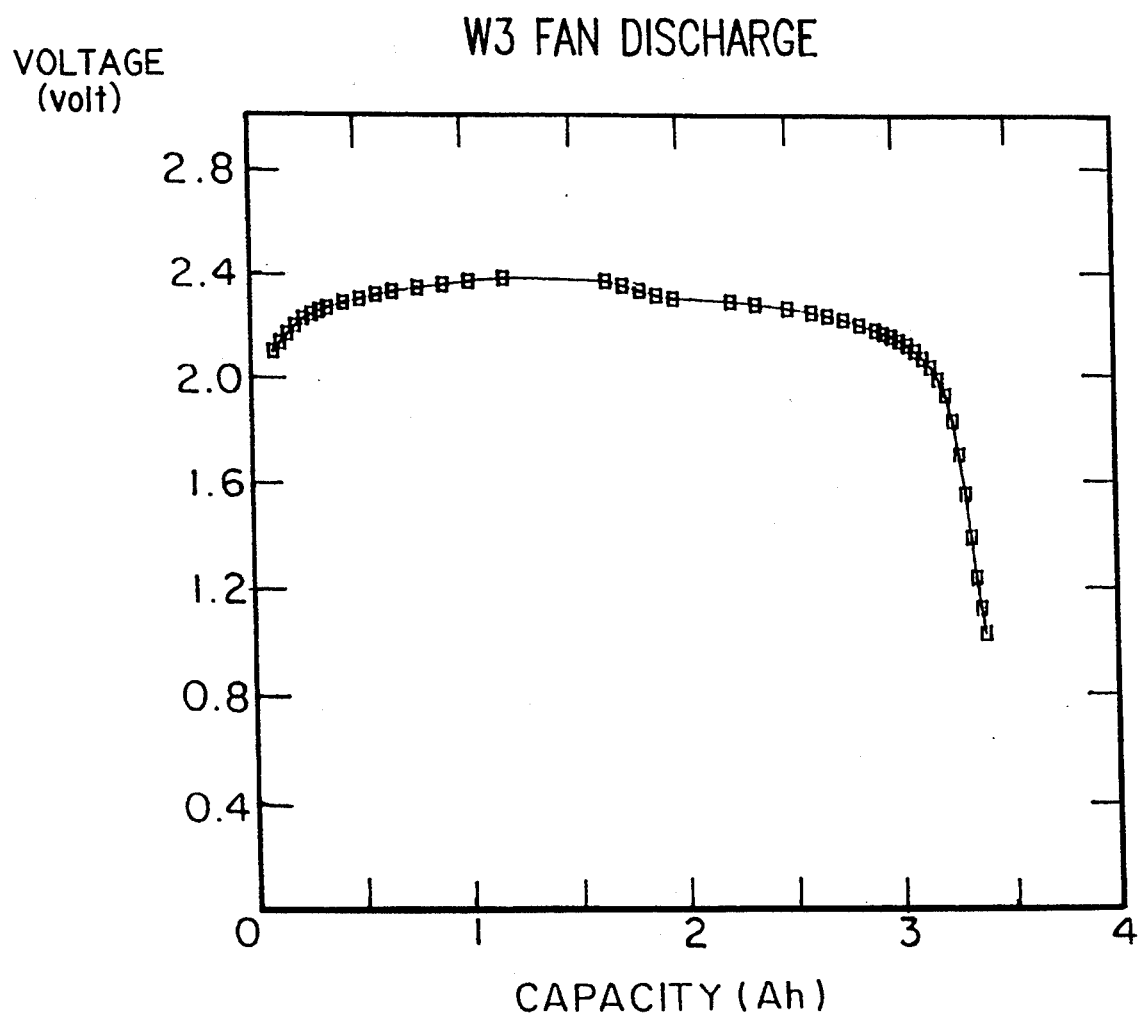
FIG. 2 is a graph of a cell discharge until cutoff voltage.

FIG. 2 illustrates the cell discharge capacity until the cell reaches its cutoff voltage.

Figure 3:
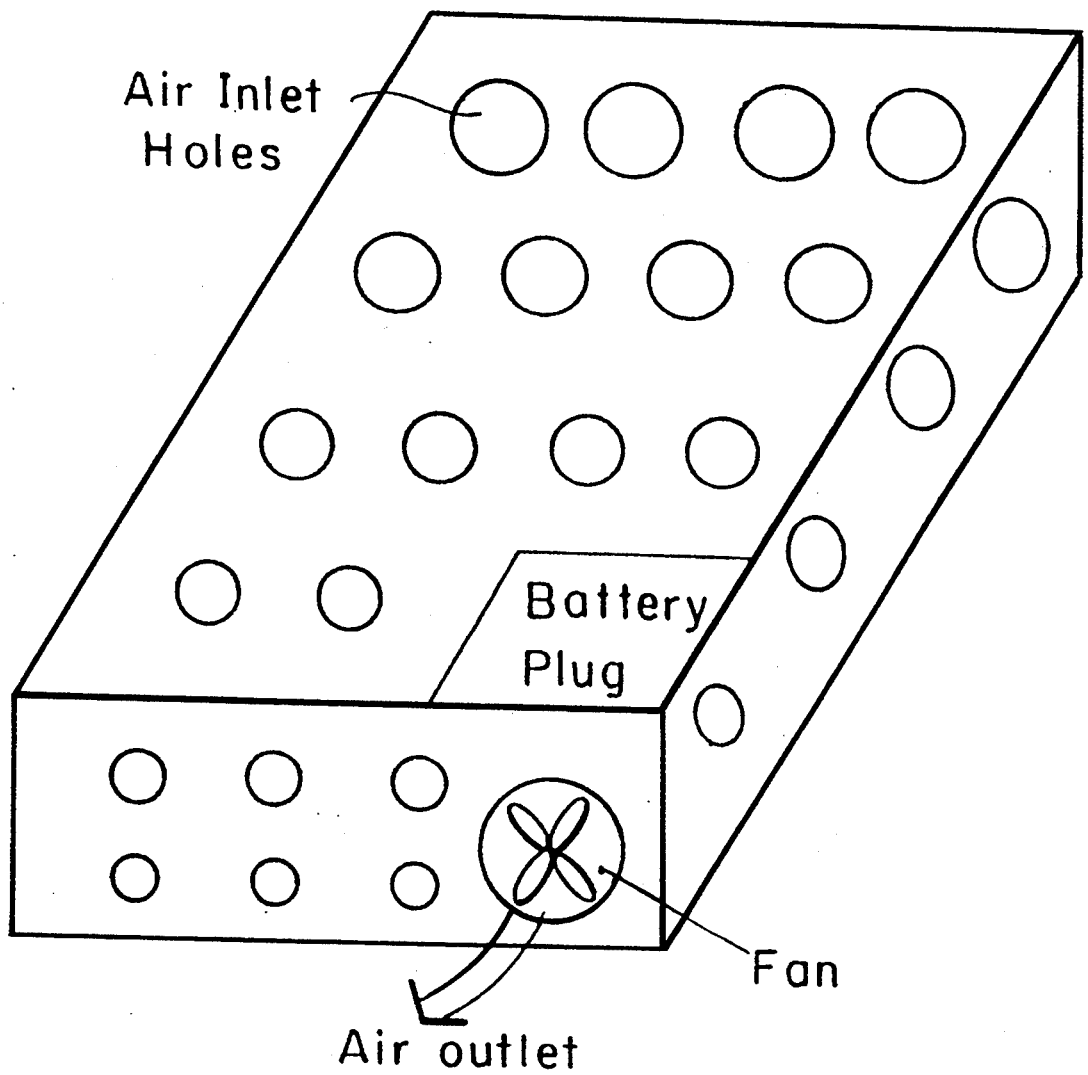
FIG. 3 is a perspective view of a battery according to the present invention illustrating air or fluid inlet or outlet holes and a fan.

FIG. 3 illustrates a multi-cell air cooled battery having air inlet holes, an air outlet, a fan and a battery plug for positioning the cell.

Results

Examples 2–4: Table 1 summarizes the preliminary test results.

The cells were discharged on 1.0 Ohm or 1.2 Ohm loads and delivered, at 50% DOD, 1.9 to 2.35 A or 4.37 to 5.1 W. Cells capacity were 2.67 to 3.19 Ah to 2.0 V cutoff voltage (FIG. 2), or 2.88 to 3.31 Ah to 1.5 V cutoff voltage. The power that was wasted on cooling the cells was only 5–7% of the useful power delivered by the cells. This low wasted power (0.25–0.33 W) was sufficient to keep the temperature of the cells can below 70° C. Without active cooling at stagnant air, the can temperature, at this discharge rate, would rise to above 120° C. in 20 minutes. It should be noted that we used an inefficient toy electric motor and fan. We believe that the wasted power can be significantly reduced by using a more efficient motor and fan.

It was demonstrated that, with the use of a simple and inexpensive motor and fan, it is possible to get up to 3.4 Ah from a C-size Calcium/TC cell at 2.35 A discharge rate (about 90 W/kg). This cooling device takes a small volume and can be easily incorporated in a multi-cell battery. This electric motor can be activated at a predetermined temperature with the use of a simple thermal switch. A sensor is provided together with the switch which are adapted to activate the fan or fans when the temperature of the cells exceed a predetermined value.

TABLE 1

Discharge performance of "C"-size cells using self air-cooling systems.

| Cell Code | Lead | Current* (A) | Voltage* (V) | Cooling* Power (W) | Capacity (Ah) (2V cut off) |
|---|---|---|---|---|---|
| T-9$^S$ | 1.0 | 2.2 | 2.2 | 0.33 | 2.67 (2.88)** |
| W-3$^S$ | 1.0 | 2.35 | 2.35 | 0.25 | 3.19 (3.31)** |
| W=2$^{SS}$ | 1.2 | 1.9 | 2.3 | 0.3 | 2.69 (2.84)** |

*at 50% DOD (Depth of Discharge)
**Capacity to 1.5V cut-off
$^S$The power to the fan was provided by external source
$^{SS}$The power to the fan was provided by the battery itself.

The invention is illustrated by way of example with reference to the enclosed schematical drawings, which are not according to scale and in which:

FIG. 1—is a schematic side-view, in partial section, of a cell according to the invention and a control circuit therefor;

FIG. 2—is a graph of a cell discharge until cutoff voltage;

FIG. 3—is a perspective view of a battery according to the present invention illustrating air or fluid inlet and outlet holes and a fan.

As shown in FIG. 1, a C-size cell system of the present invention comprises a C-cell 1; a fan 2; an inlet 3 for cool air; an outlet 4, for the hot air; a battery-holder 5; a motor-holder 6; a plastic tubular housing 7.

The cell system is illustrated as part of an arrangement for measuring cell discharge, comprising a battery load $R_L$, a voltage regulator $R_M$, and a thermal switch TS, which includes a sensor to sense the temperature of C-cell 1.

We claim:

1. A system for the supply of electrical energy from one or more high power electrochemical cells, which comprises:
   (a) at least one high power electrochemical cell having an anode made of lithium, calcium, a lithium alloy, or a calcium alloy;
   (b) a fan; and
   (c) a housing for said cell and said fan, said cell being at least partially positioned within said housing, said fan being actuated by one or more of said cells during heavy discharge and positioned to provide a forced air-circulation about said cell to prevent an excessive temperature rise which would be detrimental to said cell.

2. The system according to claim 1, wherein said cell is selected from the group consisting of Li/thionyl chloride, Li/sulphur dioxide, Ca/thionyl chloride and Ca-alloy/thionyl chloride cells.

3. The system according to claim 2, wherein said cell includes a depolarizer, said depolarizer being selected from one or more of sulfur dichloride, sulfur dioxide, thionyl chloride or $SO_2Cl_2$.

4. A system for the supply of electrical energy from an electrochemical discharge cell which comprises:
   (a) a plurality of high-power electrochemical cells, each cell having an anode made of lithium, calcium, a lithium alloy, or a calcium alloy;
   (b) a common housing having a plurality of openings which allow air circulation to provide an open cooling system, said cells being arranged within said housing and interconnected to form a battery; and,
   (c) at least one miniature fan to cool said cells by forcing air circulation during heavy discharge of said battery through said open cooling system.

5. The system according to claim 4, wherein said fan is actuated by a separate power source.

6. A system according to claim 4, further comprising a sensor and switch for actuating said fan before the temperature of said cell exceeds a temperature detrimental to said cell.

7. The system according to claim 2, comprising a plurality of high-power electrochemical cells, and a common housing provided with a plurality of openings for allowing air circulation, said cells being interconnected and arranged in said common housing to form a battery and at least one miniature fan for establishing cooling by forced air circulation during heavy discharge of the battery.

8. The system according to claim 3, comprising a plurality of high-power electrochemical cells, and a common housing provided with a plurality of openings for allowing air circulation, said cells being interconnected and arranged in said common housing to form a battery and at least one miniature fan for establishing cooling by forced air circulation during heavy discharge of the battery.

9. The system according to claim 7, wherein said at least one fan is actuated by a separate power source.

10. The system according to claim 8, wherein said at least one fan is actuated by a separate power source.

11. The system according to claim 7, comprising a sensor and switch adapted to actuate said at least one fan when the temperature of the cells exceeds a value above 70° C.

12. The system according to claim 8, comprising a sensor and switch for actuating said at least one fan when the temperature of the cells exceeds a predetermined value.

13. The system according to claim 12, wherein said at least one fan is actuated when the temperature exceeds 70° C.

14. A system according to claim 9, comprising a sensor and switch which are adapted to actuate said at least one fan when the temperature of the cells exceeds a value above 70° C.

* * * * *